(12) United States Patent
Lou (10) Patent No.: US 8,374,709 B2
(45) Date of Patent: *Feb. 12, 2013

(54) CONTROL AND OPTIMIZATION SYSTEM

(75) Inventor: Xinsheng Lou, West Hartford, CT (US)

(73) Assignee: ALSTOM Technology Ltd, Baden (CH)

( * ) Notice: Subject to any disclaimer, the term of this patent is extended or adjusted under 35 U.S.C. 154(b) by 681 days.

This patent is subject to a terminal disclaimer.

(21) Appl. No.: 12/394,509

(22) Filed: Feb. 27, 2009

(65) Prior Publication Data

US 2009/0222136 A1 Sep. 3, 2009

Related U.S. Application Data

(60) Provisional application No. 61/033,185, filed on Mar. 3, 2008, provisional application No. 61/033,210, filed on Mar. 3, 2008, provisional application No. 61/033,202, filed on Mar. 3, 2008.

(51) Int. Cl.
*G05B 13/02* (2006.01)
(52) U.S. Cl. ............... 700/50; 700/28; 702/31
(58) Field of Classification Search .......... 422/105–108, 422/110, 113, 119; 700/28–33, 37, 40–50; 702/31, 32
See application file for complete search history.

(56) References Cited

U.S. PATENT DOCUMENTS

| | | | |
|---|---|---|---|
| 5,762,008 A | 6/1998 | Martin et al. | |
| 5,806,052 A | 9/1998 | Bonissone et al. | |
| 6,222,164 B1 | 4/2001 | Stoddard et al. | |
| 6,408,227 B1 * | 6/2002 | Singhvi et al. | 700/266 |
| 7,083,658 B2 | 8/2006 | Andrus, Jr. et al. | |
| 7,533,620 B2 | 5/2009 | Morin et al. | |
| 2004/0133363 A1 * | 7/2004 | Vaidyanathan et al. | 702/30 |
| 2005/0075993 A1 | 4/2005 | Jang et al. | |
| 2006/0096175 A1 * | 5/2006 | Russell et al. | 48/127.5 |
| 2006/0100721 A1 | 5/2006 | Piche | |
| 2007/0250215 A1 | 10/2007 | Jia et al. | |

FOREIGN PATENT DOCUMENTS

| | | |
|---|---|---|
| GB | 2350695 | 12/2000 |
| GB | 2440674 | 2/2008 |

OTHER PUBLICATIONS

U.S. Appl. No. 12/394,200, filed Feb. 27, 2009.
U.S. Appl. No. 12/394,654, filed Feb. 27, 2009.
PCT International Search Report and the Written Opinion of the International Searching Authority dated Mar. 8, 2009—(PCT/US2009/035674).
PCT International Search Report and the Written Opinion of the International Searching Authority dated Aug. 7, 2009—(PCT/US2009/035672).
S. Maley, R. Romanosky; "Plant Process Control Workshop" U.S. Department of Energy, National Energy Technology Laboratory, Mar. 22, 2006 XP-002532105; p. 18-25, p. 51-52.
A.G. Abilov, Z. Zeybek, O. Tuzunalp, Z. Telatar: "Fuzzy Temerature Contol of Industrial Refineries Furnaces Through Combined Feedforward/Feedback Multivariable Cascade Systems" Chemical Engineering and Processing 41, Jan. 5, 2001, XP002532106 the whole document.

(Continued)

*Primary Examiner* — Jill Warden
*Assistant Examiner* — Dwayne K Handy
(74) *Attorney, Agent, or Firm* — Robert D. Crawford (57) ABSTRACT

A system for optimizing a power plant includes a chemical loop having an input for receiving an input parameter (270) and an output for outputting an output parameter (280), a control system operably connected to the chemical loop and having a multiple controller part (230) comprising a model-free controller. The control system receives the output parameter (280), optimizes the input parameter (270) based on the received output parameter (280), and outputs an optimized input parameter (270) to the input of the chemical loop to control a process of the chemical loop in an optimized manner.

21 Claims, 5 Drawing Sheets

OTHER PUBLICATIONS

Tiejun Zhang et al: "Terminal Cost Constraint based Stable Fuzzy Model Predictive Control of a Nonlinear Fluidized Bed Combustion Plant" Intelligent Control, 2007. ISIC 2007. IEEE 22nd International Symposium on, IEEE, PI, Oct. 1, 2007, pp. 401-406, XP301230209, ISBN: 978-1-4244-0440-7 abstract p. 401.

Susan M. Maley and Robert R. Romanosky; "Stakeholder Workshop. Advanced Process Control for Next Generation Power Plants. Summary Report" Internet Citation, [Online] Jul. 1, 2007, p. 78pp, XP009121863.

Xinsheng Lou et al.: "Simulation and Advanced Controls for Hybrid Combustion-Gasification Chemical Looping Process" 18th Annual Joint ISA POWID/EPRI Controls and 51st ISA POWID Symposia 2008; Jun. 8-13, 2008, Scottsdale, Arizona, USA,, vol. 475, Jun. 8, 2008, pp. 326-337, XP009118467, ISBN: 978-1-60560-410-7.

\* cited by examiner

CONTROL AND OPTIMIZATION SYSTEM

CROSS-REFERENCE TO RELATED APPLICATIONS

The present invention claims the benefit of U.S. Provisional Patent Application Ser. No. 61/033,202, entitled "CONTROL AND OPTIMIZATION SYSTEM", co-pending U.S. Provisional Patent Application 61/033,210, entitled "FUZZY LOGIC CONTROL AND OPTIMIZATION SYSTEM", and U.S. Provisional Patent Application Ser. No. 61/033,185, entitled "INTEGRATED CONTROLS DESIGN OPTIMIZATION", all of which are incorporated herein by reference in their entirety.

STATEMENT REGARDING FEDERALLY SPONSORED RESEARCH OR DEVELOPMENT

The U.S. Government has rights in this invention pursuant to Contract No. DE-FC26-07NT43095 awarded by the U.S. Department of Energy.

TECHNICAL FIELD

The present disclosure relates generally to a control and optimization system and, more particularly, to a control and optimization system for a chemical looping process.

BACKGROUND

Chemical looping (CL) is a recently developed process which can be utilized in electrical power generation plants which burn fuels such as coal, biomass, and other opportunity fuels. The CL process can be implemented in existing or new power plants, and provides promising improvements in terms of reduced plant size, reduced emissions, and increased plant operational efficiency, among other benefits.

A typical CL system utilizes a high temperature process, whereby solids such as calcium- or metal-based compounds, for example, are "looped" between a first reactor, called an oxidizer, and a second reactor, called a reducer. In the oxidizer, oxygen from air injected into the oxidizer is captured by the solids in an oxidation reaction. The captured oxygen is then carried by the oxidized solids to the reducer to be used for combustion and/or gasification of a fuel such as coal, for example. After a reduction reaction in the reducer, the solids, no longer having the captured oxygen, are returned to the oxidizer to be oxidized again, and the cycle repeats.

The CL process is more complicated than processes of traditional plants such as conventional circulating fluidized bed (CFB) plants, for example. In particular, control of circulating solids in the CL process requires multi-loop interactive flow and inventory controls which are not required in traditional plants. As a result, traditional plant controls applied to the CL process necessarily result in separate control loops for each CL loop. However, using separate control loops for each CL loop is inefficient and does not optimize performance of the CL process, since accurate control depends on coordinated control between individual loops. Thus, interactions between variables for each loop of the CL process have to be taken into account to optimize overall CL process performance.

In addition, the CL process has multi-phase flows and chemical reactions which are characterized by process nonlinearities and time delays due to mass transport and chemical reaction rates. As a result, traditional power plant design without considering control optimization systems in early stages of process design is further inadequate for integrated optimization of process performance and system operability.

Optimization tools which have been developed thus far are focused on optimizing conventional combustion power plants. As a result, these optimization tools have been focused on solving very specific, localized optimization problems rather than global optimization of complex plant operations. Additionally, statistical analysis methods associated with optimization of conventional combustion power plants is based upon an assumption of linear relationships between variables. As a result, these statistical analysis methods are cumbersome and inaccurate when used to analyze the complex, inter-related, nonlinear dynamics of variables in the CL process.

In the next generation power plants based on a CL system, steam-water side control requirements will remain essentially the same as in current conventional plants (e.g. feedwater and steam flows, steam pressures, steam temperatures, drum levels). However, it is expected that improved controls which utilize both steam-water side variables and combustion/gasification CL variables will be required to better handle inherent process variable interactions in the CL process. In addition, conventional power plant simulators are limited to steam/water side process dynamics and only very simple combustion or furnace process dynamics are modeled; dynamic models of complex atmosphere control systems such as in the CL process are not available at this time. Neural network (NN) modeling has been used for conventional power plant simulators, but implementing this approach for a CL-based power plant has thus far required a prohibitive amount of time and effort to collect the required amount of statistically significant test data to develop a validated NN model for the more complex process dynamics associated with the CL plant.

Accordingly, it is desired to develop a control and optimization system and, more particularly, an integrated control and optimization system for a chemical looping process, which overcomes the shortfalls described above.

SUMMARY

According to the aspects illustrated herein, there is provided a system for optimizing a power plant which includes a chemical loop having an input for receiving an input parameter and an output for outputting an output parameter, a control system operably connected to the chemical loop and having a multiple controller part comprising a model-free controller. The control system receives the output parameter, optimizes the input parameter based on the received output parameter, and outputs an optimized input parameter to the input of the chemical loop to control a process of the chemical loop in an optimized manner.

According to the other aspects illustrated herein, a system for optimizing a power plant includes a first chemical loop having a first input for receiving a first input parameter and a first output for outputting a first output parameter. The first chemical loop includes a first reactor having at least a first inlet and a first outlet, a first separator operably connected to the first outlet of the first reactor, and a first seal pot control valve disposed between the first separator and the first inlet of the first reactor. The system further includes a control system operably connected to the first chemical loop and having a multiple controller part including a model-free controller. The control system receives the first output parameter, optimizes the first input parameter based on the received first output parameter, and outputs an optimized first input parameter to the first input of the first chemical loop to control a process of the first chemical loop in an optimized manner According to yet other aspects illustrated herein, a system for optimizing a power plant includes a chemical loop having an input for receiving an input parameter and an output for outputting an output parameter. The chemical loop includes a reactor having at least an inlet and an outlet, a separator operably connected to the reactor outlet, and a seal pot control valve disposed between the separator and the reactor inlet. The system further includes a control system having a multiple controller part including at least one of a model-based controller, a proportional-integral-derivative controller, a fuzzy controller, and a neural network adaptive controller, and a control set algorithm operably connected to the multiple controller part. The multiple controller part further includes an optimizer operably connected to the control set algorithm, a security watchdog model connected to the control set algorithm, and a chemical looping process simulator operably connected to the chemical loop. The control system receives the output parameter from the output of the chemical loop, optimizes the input parameter based on the received output parameter, and outputs an optimized input parameter to the input of the chemical loop to control a process of the chemical loop in an optimized manner.

The above described and other features are exemplified by the following figures and detailed description.

BRIEF DESCRIPTION OF THE DRAWINGS

Referring now to the figures, which are exemplary embodiments, and wherein the like elements are numbered alike.

DETAILED DESCRIPTION

Figure 1:
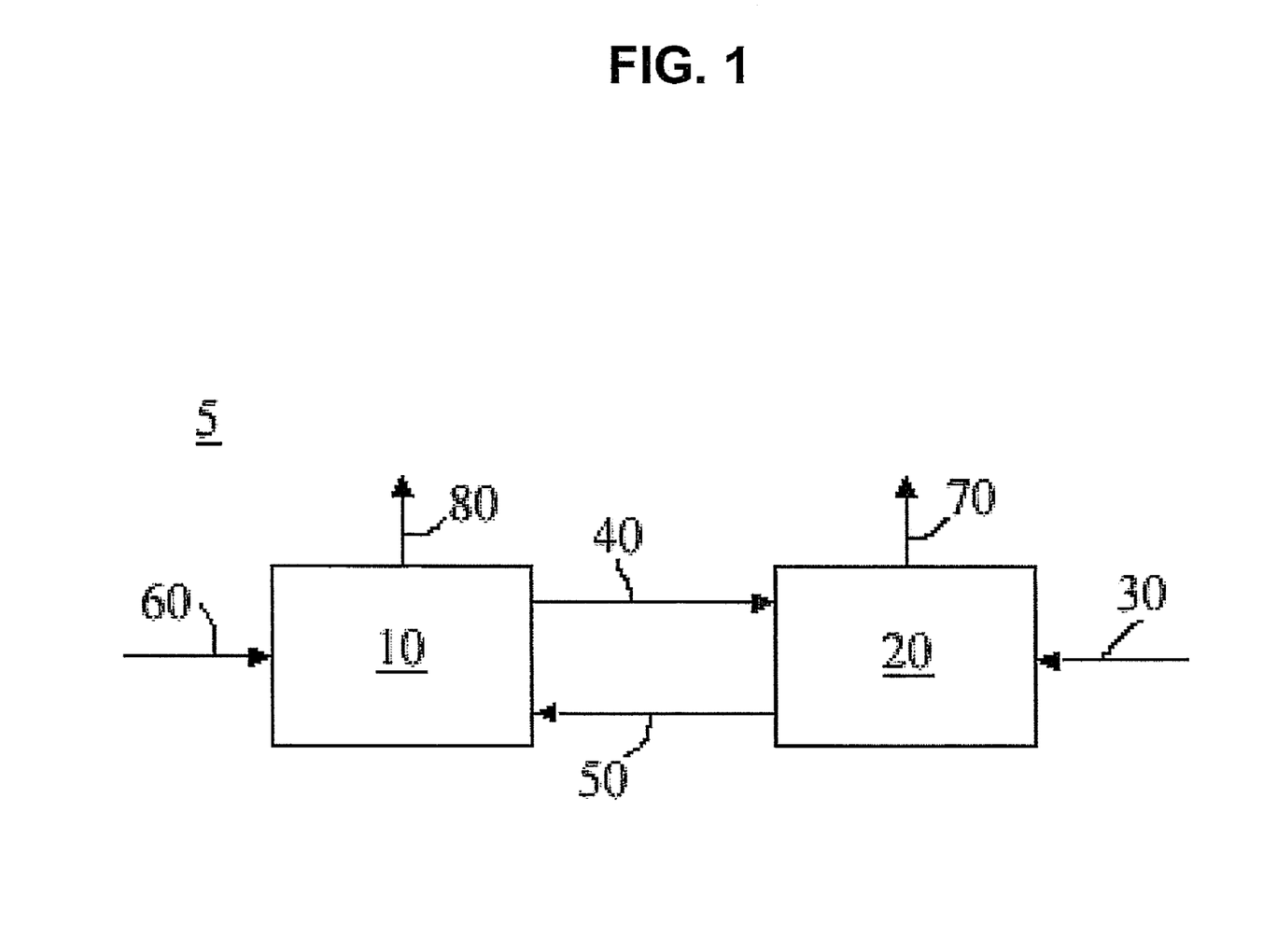
FIG. 1 is a block diagram of a metal oxide-based two loop chemical looping (CL) system.

Disclosed herein is a control and optimization system for a chemical looping (CL) system of a CL-based power plant, similar to that described in greater detail in U.S. Pat. No. 7,083,658, which is incorporated herein by reference. Referring to FIG. 1, a CL system 5 includes a first loop 10, e.g., a reducer 10, and a second loop 20, e.g., an oxidizer 20. Air 30 is supplied to the oxidizer 20, and calcium (Ca) 40 is oxidized therein to produce a calcium oxide (CaO) 50. The CaO 50 is supplied to the reducer 10, and acts as a carrier to deliver oxygen to fuel 60 (such as coal 60, for example) supplied to the reducer 10. As a result, the oxygen delivered to the reducer 10 interacts with the coal 60 in the reducer 10. Reduced metal oxide, i.e., the metal 40, is then returned to the oxidizer 20 to again be oxidized into CaO 50, and the cycle described above repeats.

Nitrogen gas ($N_2$) 70, extracted from the air 30 during oxidation, as well as heat (not shown) resulting from the oxidation, exit the oxidizer 20. Likewise, a gas 80 produced during reduction in the reducer 10 exits the reducer 10. The gas 80 includes, for example, a synthesis gas (syngas), hydrogen gas ($H_2$), and/or carbon dioxide gas ($CO_2$). Composition of the gas 80, e.g., proportions of the syngas, the $H_2$, and/or the $CO_2$ therein, varies based upon a ratio of the coal 60 to the air 30.

Exemplary embodiments are not limited to two loops, as described above with reference to FIG. 1, but instead may include either a single loop or more than two loops. For example, in an alternative exemplary embodiment, the CL system 5 includes a third loop (not shown), such as a calciner loop, for example, which allows $H_2$ generation from reformed syngas 80.

Yet another alternative exemplary embodiment utilizes a calcium-based CL system 5 which includes a thermal loop which generates steam to drive a turbine, for example. Specifically, referring to FIG. 2, a thermal loop 90, includes a steam turbine 95 which drives a power generator 100 using steam 105 generated by boiling feedwater 110 with heat produced during oxidation in the oxidizer 20.

Figure 2:
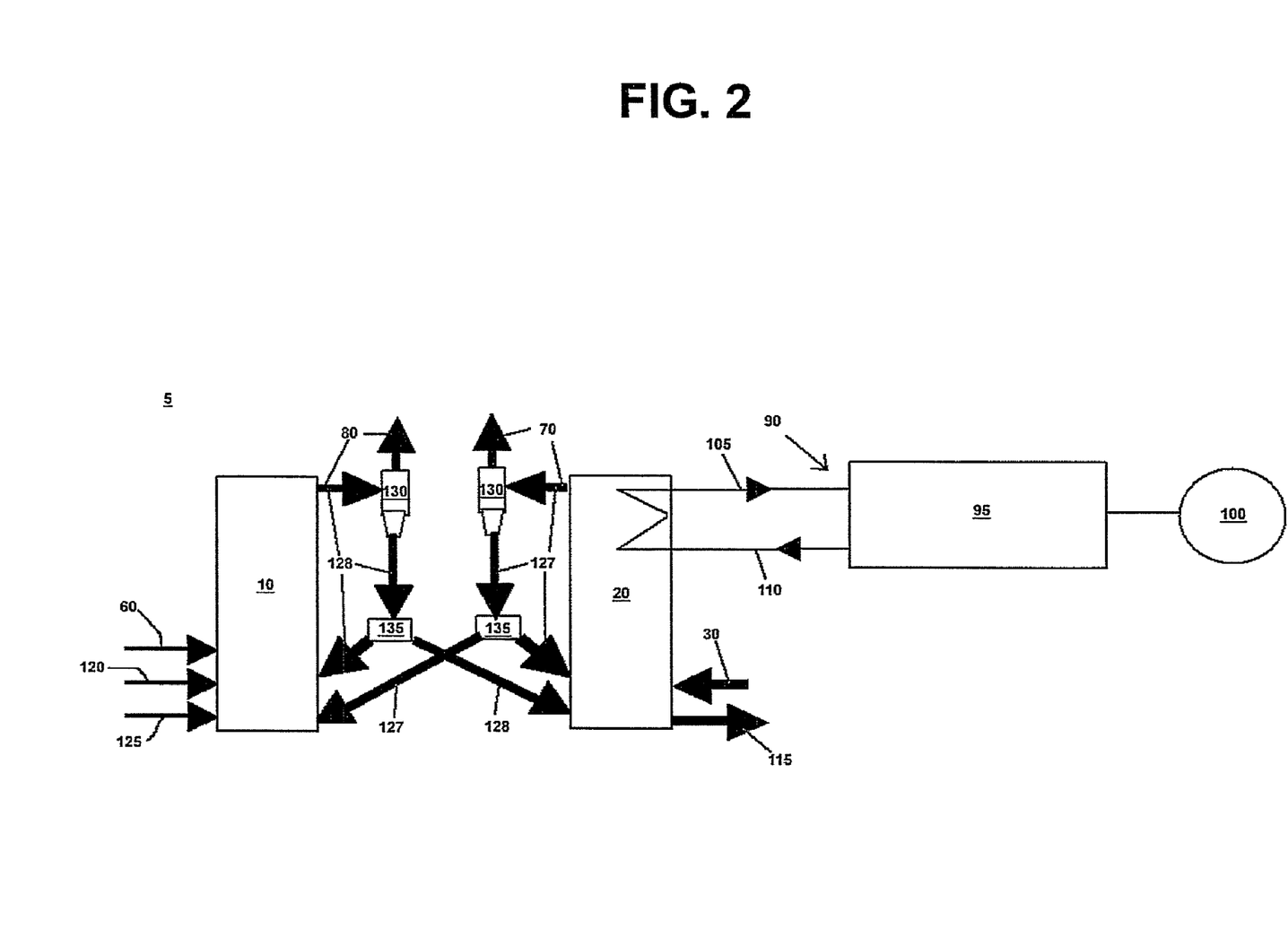
FIG. 2 is a block diagram of a CL combustion-based steam power plant.

The air 30 is supplied to the oxidizer 20, as described above with reference to FIG. 1, while waste 115, such as ash 115 and/or excess calcium sulfate ($CaSO_4$) 115, are removed from the oxidizer 20 for disposal in an external facility (not shown). The coal 60, as well as calcium carbonate ($CaCO_3$) 120 and recirculated steam 125, are supplied to the reducer 10 for a reduction reaction therein.

In operation, the reduction reaction occurs between carbon and sulfur in the coal 60, the $CaCO_3$ 120, and $CaSO_4$ 127, and produces calcium sulfide (CaS) 128, which is separated by a separator 130, such as a cyclone separator 130, and is thereafter supplied to the oxidizer 20 through a seal pot control valve (SPCV) 135. A portion of the CaS 128, based upon CL plant load, for example, is recirculated to the reducer 10 by the SPCV 135, as shown in FIG. 2. In addition, the separator separates the gas 80, e.g., $CO_2$ 80, from the CaS 128.

The CaS 128 is oxidized in an oxidation reaction in the oxidizer 20, thereby producing the $CaSO_4$ 127 which is separated from the $N_2$ 70 by a separator 130 and is supplied back to the reducer 10 via a SPCV 135. A portion of the $CaSO_4$ 127 is recirculated back to the oxidizer 20 by the SPCV 135 based upon CL plant load, for example. The oxidation reaction also produces heat which boils the feedwater 110 into the steam 105 supplied to the steam turbine 95.

While a calcium oxide based CL system has been described, the present invention is also applicable to a metal oxide based CL system similar to that described in U.S. patent application Ser. No. 10/542,749, which is incorporated herein by reference.

An exemplary embodiment of a control and optimization system for a CL process of a CL-based plant will now be described in further detail with reference to FIGS. 3 and 4. It will be noted that the control and optimization system is not limited to the CL plant configurations described herein. For example, in alternative exemplary embodiments, the integrated process design and control optimization tool may be used with any and all CL-based systems, including but not limited to: single, dual, and multiple, e.g., two or more, loop CL systems, whether calcium- or metal oxide-based; CL-based plant with $CO_2$ capture for utilization or sequestration; and CL-based $CO_2$-ready power plants, but is not limited thereto.

As described above, the CL process involves multi-phase flows and chemical reactions which are characterized by process nonlinearities and time delays due to, among other things, mass transport rates and chemical reaction rates. As a result, nonlinear control and optimization techniques are required for the CL process. Specifically, an exemplary embodiment includes nonlinear dynamic chemical looping modeling and simulation derived from first principle equations (mass, momentum, and energy balances, for example). The modeling and simulation includes any combination of ordinary differential equations (ODEs), algebraic equations (AEs), and partial differential equations (PDEs). In addition, empirical modeling methods, e.g., data driven models, such as neural networks (NN), nonlinear autoregressive network with exogenous inputs (NARX), nonlinear auto regressive moving average with exogenous inputs (NARMAX), Wiener-Hammerstein models, and wavelet network models, for example, are used in a hybrid dynamic model structure which combines simplified first-principle models with data-driven models. Further, multivariable model predictive controls (MPC) using both linearized models and nonlinear models provide solutions to dynamic optimization of the CL process. In addition to providing optimized modeling, simulation and control, the multivariable MPC according to an exemplary embodiment is robust to disturbances and model inaccuracy, thereby providing stabilized control of the CL process, as will be described in further detail below.

Figure 3:
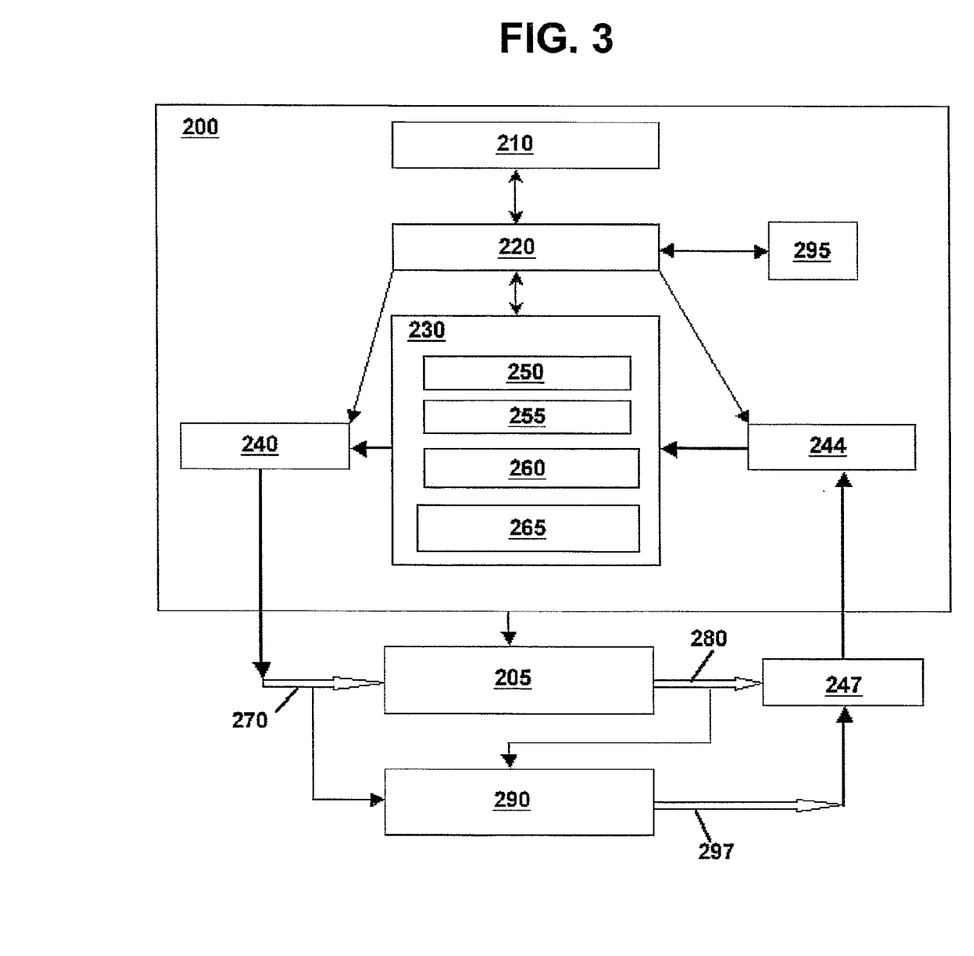
FIG. 3 is a block diagram of a control and optimization system for a CL process or a CL-based plant.

Referring to FIG. 3, a control and optimization system 200 for a CL-based power plant 205 is shown. In an exemplary embodiment, the control and optimization system 200 is an MPC system 200, but alternative exemplary embodiments are not limited thereto.

The control system 205 according to an exemplary embodiment includes an optimizer 210, a control algorithm set 220, a multiple controller part 230, a multiple controller output adapter 240, a multiple controller input adapter 244, and a power plant output adapter 247. The multiple controller part 230 provides regulatory control of the CL system 5, and includes individual controllers, e.g., control modules, such as a proportional-integral-derivative (PID) controller 250, a fuzzy controller 255, an adaptive controller 260, and a model-based controller 265. The adaptive controller 260 includes self-tuning adaptive controls, neuro-adaptive controls, a neural network (NN) and/or a wavelet network. The CL-based power plant 205 has an input parameter 270 and an output parameter 280. In addition, a CL process simulator 290 is provided, as shown in FIG. 3.

The control and optimization system 200 according to an exemplary embodiment further includes a security "watchdog" module 295 which monitors the control and optimization system 200 to maintain system security against software and/or hardware faults, as well as external attacks (e.g., hackers). More specifically, the control algorithm set 220 communicates with the security watchdog module 295 and determines, based upon inputs from security watchdog module 295 and the optimizer 210, whether to switch controllers, for example, as described below in further detail.

In an exemplary embodiment, the input parameter 270 includes, but is not limited to, fuel flow, sorbent flow, air flow, water flow, limestone flow, solids circulation flow, a plant start-up control logic algorithm, a plant shut-down control logic algorithm, and a ratio of at least two of fuel flow, air flow, limestone flow and steam flow. Likewise, the output parameter 280 includes power generation rate, $CO_2$ flow, $CO_2$ utilization, $CO_2$ capture, $CO_2$ storage, $CO_2$ sequestration, load demand, solids transport inventory, reactor temperature, loop temperature, bed temperature, pressure, differential pressure, reactor pressure, reactor differential pressure, $H_2$ flow, $N_2$ flow, and syngas flow, for example, but alternative exemplary embodiments are not limited thereto.

The control and optimization system 200 according to an exemplary embodiment uses model free advanced controls such as fuzzy controls and/or NN adaptive controls, for example. Adding the model free advanced controls provides an additional advantage of allowing efficient optimization of multiple performance objectives of complex processes such as the CL process of the CL-based power plant 205, for example. In addition, the model free advanced controls can also serve as fault tolerant controls which enhance overall reliability and availability of the CL-based power plant 205.

In an exemplary embodiment, the CL-based power plant 205 is a calcium-based three loop CL system 205, as described above in greater detail with reference to FIG. 2, but alternate exemplary embodiments are not limited thereto. For example, the CL-based power plant 205 may be one of any and all CL-based systems, including but not limited to: single, dual, and multiple, e.g., two or more, loop CL systems (whether calcium- or metal oxide-based); CL-based plants with $CO_2$ capture for utilization or sequestration; and CL-based $CO_2$-ready power plants, but alternative exemplary embodiments are not limited thereto.

Still referring to FIG. 3, the optimizer 210 in an exemplary embodiment is a system/plant optimizer 210. More specifically, the system/plant optimizer 210 is a high level supervisor engine which computes an optimal plant operating setting (or settings), e.g., the input parameter 270, to meet overall operating performance objectives. The system/plant optimizer 210 may be based on an existing CL-based power plant 205 (or system/subsystem thereof) model or, alternatively, the system/plant optimizer 210 may be a rule based decision-making engine, such as an engine based on fuzzy logic rules and/or deterministic logic rules.

The system/plant optimizer 210 communicates with the control algorithm set 220. The control algorithm set 220 includes modules (not shown) each having associated control laws, and more specifically, fault tolerant control laws, as well as other control and information system firmware (not shown). The control set algorithm may also include a fuzzy controller, an adaptive controller and a MPC controller to oversee the regulatory controls of the multiple controller part 230. The MPC controller may include PID based regulatory controls, self-tuning adaptive controls, neuro-adaptive controls, NN controls, and/or wavelet network controls. MPC controllers can be used in a parallel or cascade. In a cascade MPC configuration, one MPC can supervise one or more MPC controllers or other type of controllers as well.

In an exemplary embodiment, the multiple controller part 230 includes the PID controller 250, the fuzzy controller 255, the NN adaptive controller 260, and the model-based controller 265 of the multiple controller part 230, but alternative exemplary embodiments are not limited thereto. Based upon a value of the output parameter 280, as well as interactions of the optimizer 210 and the security watchdog module 295, and using the control laws of the control algorithm set 220, the multiple controller part 230 selects one of the PID controller 250, the fuzzy controller 255, the NN adaptive controller 260, and the model-based controller 265 of the multiple controller part 230 to adjust a value of the input parameter 270, thereby effectively controlling the CL-based power plant 205 in an optimal manner. More specifically, the multiple controller part 230 chooses a controller based upon an operating state/condition of the CL-based power plant 205, as well as the control laws of the control set algorithm 210, an input from the system/plant optimizer 210, and an input from the security watchdog module 295.

As a result of the multiple controller part 23 having a plurality of controllers to select from, the control and optimization system 200 according to an exemplary embodiment is tolerant to both disturbances and/or noise therein, and is able to continue operating despite a failure of a given controller, e.g., one of the PID controller 250, the fuzzy controller 255, the adaptive controller 260, and/or the model-based controller 265 of the multiple controller part 230.

Each of the individual controllers of the multiple control part will now be described in further detail. The PID controller 250 is a standard conventional controller, e.g., a controller with proportional, integral, and (optionally) derivative terms. The PID controller 250 is a simple model-free, general purpose automatic controller which is used to control simple processes of the CL-based power plant 205, for example. Thus, the PID controller 250 may be used for steady state, time-invariant, substantially linear, processes, for example, where complex controllers are not required.

The fuzzy controller 255 is an advanced model-free controller based on fuzzy logic design. More specifically, the fuzzy controller 255 uses fuzzy math algorithms, which take advantage of relational functionalities between complex process dynamics, rather than a conventional plant model. As a result, control decisions for the CL-based power plant 205 are thereby generated based on the fuzzy math algorithms and the control set algorithm 220. Thus, in an exemplary embodiment, the fuzzy controller 255 is utilized, for example, when using the PID controller 250 would be less efficient under current operating conditions of the CL-based power plant 205 such as during plant transients or load changes, for example.

Similarly, the NN adaptive controller 260 is a type of adaptive controller which uses a neural network, rather than a conventional plant model, as a control engine. More specifically, the NN adaptive controller 260 includes a group of nodes, or processing elements, interconnected to form a network. A mathematical algorithm is then used to determine interactions between the nodes as a signal, e.g., a control signal for the CL-based power plant 205, travels from an input node or nodes, "through" the network and on to an output node or nodes. The algorithm may, over time, alter a preference for interactions between the nodes, making the NN an adaptive model. Thus, the NN models complex relationships between inputs and outputs in an adaptive manner. In addition, the NN adaptive controller 260 is multivariate and nonlinear, thereby capable of analyzing multiple-variable processes wherein relationships between variables are complex and nonlinear. Therefore, in an exemplary embodiment the NN adaptive controller 255 is utilized when using the PID controller 250 and/or the fuzzy controller 255 would be less efficient under current operating conditions of the CL-based power plant 205, for example.

The model-based controller 265 is a conventional controller which uses a model (or models), unlike the PID controller 250, the fuzzy controller 255, and the NN adaptive controller 260, which are all model-free, as described above. In an exemplary embodiment, the model-based controller 265 is used, for example, when the PID controller 250, the fuzzy controller 255, and the NN adaptive controller 260 are not available, or when the CL-process simulator 290, described below, is used for simulation of the CL-based power plant 205 during personnel training, for example.

Still referring to FIG. 3, the multiple controller input adapter 244 according to an exemplary embodiment is a switch which selects one or more of the PID controller 250, the fuzzy controller 255, the NN adaptive controller 260, and the model-based controller 265 of the multiple controller part 230. More specifically, the multiple controller input adapter 244 selects an appropriate controller/controllers based upon the multiple controller part 230, which chooses a controller or controllers according to an operating state/condition of the CL-based power plant 205, as well as the control laws of the control set algorithm 210, the input from the system/plant optimizer 210, and the input from the security watchdog module 295, as described above. In an alternative exemplary embodiment, the multiple controller input adapter 244 may also perform other logic and/or mathematic operations over the controller signals such as averaging selected control signals from two or more parallel multiple controllers, for example, but is not limited thereto.

In an exemplary embodiment, the multiple controller output adapter 240 is a switch which closes associated control loops (not shown) based upon which controller or controllers (of the PID controller 250, the fuzzy controller 255, the NN adaptive controller 260, and/or the model-based controller 265) are selected by the multiple controller input adapter 244, as described above. In an alternative exemplary embodiment, however, the multiple controller output adapter 240 may be, for example, a weighted average function module 240 (not shown) which optimizes the control signals selected by the multiple controller input adapter 244 before the control signals are sent to actuators (not shown) or cascade controllers (not shown), for example, of the CL-based power plant 205.

The power plant output adapter 247 is an operator, and more specifically, may be a switch 247, a weighted average engine 247, a signal conditioner 247, or a fault detector 247. Thus, the power plant output adapter 247 conditions the output parameters 280 such that the output parameters 280 are in an appropriate form to be used according a configuration of the control and optimization system 200, e.g., based upon which controller or controllers (of the PID controller 250, the fuzzy controller 255, the NN adaptive controller 260, and/or the model-based controller 265) are selected by the multiple controller input adapter 244, as described above.

The CL process simulator 290 provides a simulator output 297 which is used, for example, in controls design and testing, training of personnel, and fault simulations to support fault diagnosis of the control system 205. The training may be performed offline, e.g., standalone, or online, e.g. tied to a distributed control system (DCS) (not shown) of the CL-based power plant. Further, the CL process simulator 290 itself may be offline or online.

Figure 4:
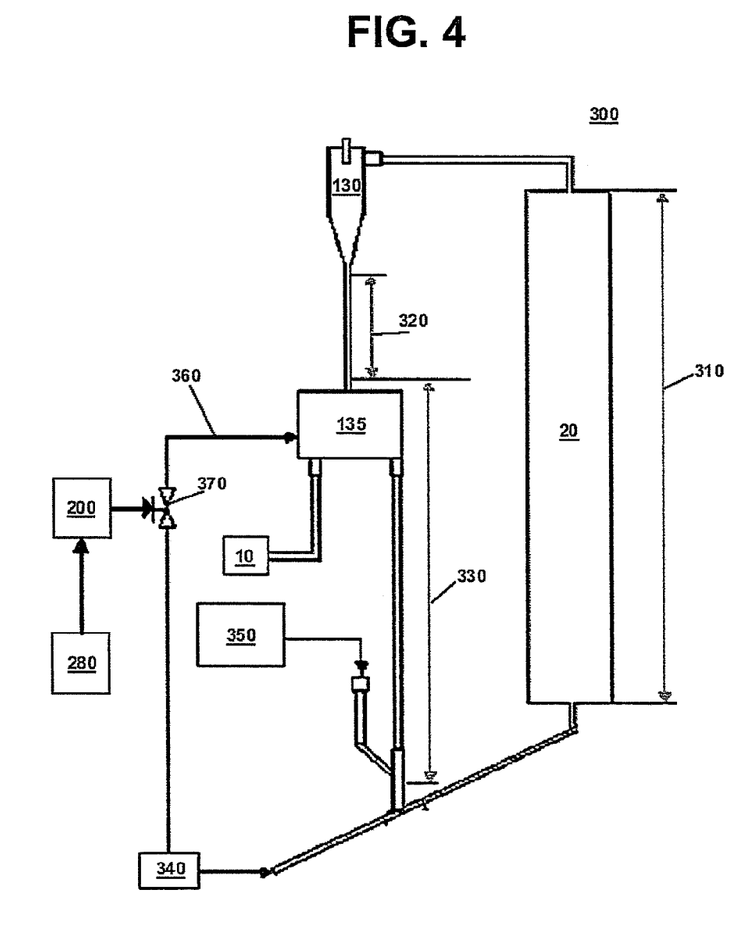
FIG. 4 is block diagram which illustrates implementation of a control and optimization system in a in a single loop of a calcium CL process with multiple loops.

Referring now to FIG. 4, implementation of the control and optimization system 200 (FIG. 3) with a single loop 300 of the CL-based power plant 205 will be described in further detail. In an exemplary embodiment, the single loop 300 is an oxidizer loop 300, such as in a calcium-based three loop CL system described in greater detail with reference to FIGS. 2 and 5 (with complementary components reference with a prime '), but alternative exemplary embodiments are not limited thereto. For example, the control and optimization system 200 may be implemented with one of any and all CL-based systems, including but not limited to: single, dual, and multiple, e.g., two or more, loop CL systems (whether calcium- or metal oxide-based); CL-based plants with $CO_2$ capture for utilization or sequestration; and CL-based $CO_2$-ready power plants, as described in U.S. Pat. No. 7,083,658 and U.S. patent application Ser. No. 10/542,749, but alternative exemplary embodiments are not limited thereto. In addition, the control and optimization system 200 may be a single control and optimization system 200, or multiple control and optimization systems 200 may be utilized in the abovementioned variations of CL-based systems.

Further, for purposes of discussion with reference to FIG. 4, the control and optimization system 200 optimizes and controls a single input parameter 270 and output parameter 280. Specifically, the control and optimization system 200 optimizes and controls regulation of a differential pressure (described in further detail below). However, alternative exemplary embodiments are not limited to the single input parameter 270 and output parameter 280. Instead, the control and optimization system 200 according to alternative exemplary embodiments may regulate multiple input parameters 270 and output parameters 280. As discussed above, the input parameters 270 according to an exemplary embodiment include, but are not limited to: fuel flow, sorbent flow, air flow, water flow, limestone flow, solids circulation flow, a plant start-up control logic algorithm, a plant shut-down control logic algorithm, and a ratio of at least two of fuel flow, air flow, limestone flow and steam flow. In addition, the output parameters 280 include: power generation rate, $CO_2$ flow, $CO_2$ utilization, $CO_2$ capture, $CO_2$ storage, $CO_2$ sequestration, load demand, solids transport inventory, reactor temperature, loop temperature, bed temperature, pressure, differential pressure, reactor pressure, reactor differential pressure, $H_2$ flow, $N_2$ flow, and syngas flow, for example, but alternative exemplary embodiments are not limited thereto.

Referring to FIG. 4, the control and optimization system 200 receives an output parameter 280, such as a differential pressure difference 280. Specifically, the differential pressure difference 280 is a difference between a riser differential pressure (D/P) 310 and a seal D/P (not shown). More specifically, the seal D/P is a sum of a dip leg D/P 320 and a return leg D/P 330. Thus, the control and optimization system 200 controls a difference between a riser section, e.g., a portion of the single loop 300 which corresponds to the oxidizer 20 (described in greater detail above with reference to FIG. 2), and a seal section, e.g., a portion of the single loop which corresponds to the SPCV 135 (also described in greater detail above with reference to FIG. 2).

Figure 5:
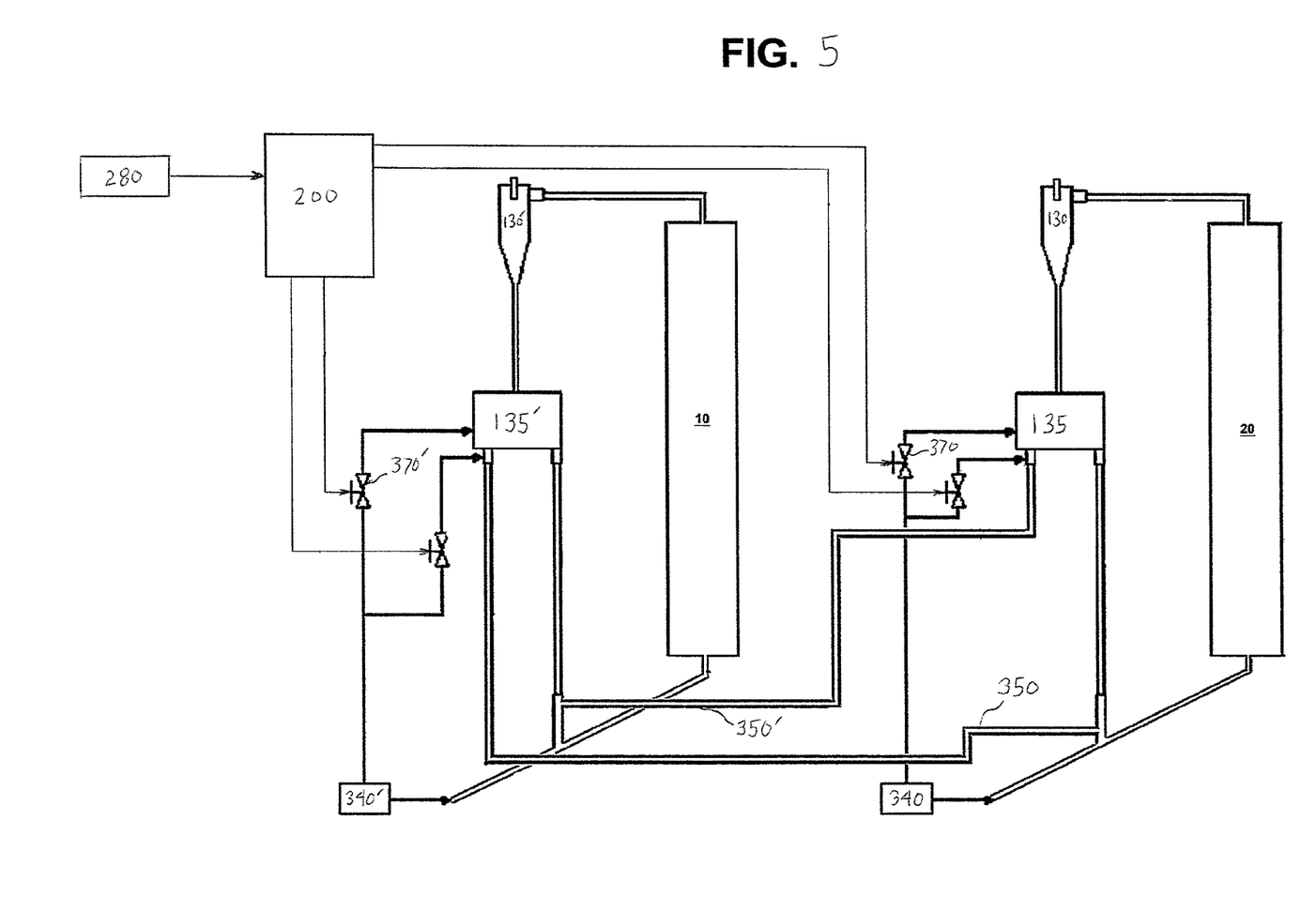
FIG. 5 is block diagram which illustrates implementation of a control and optimization system in a in a dual loop of a calcium CL process with multiple loops.

As described above in greater detail, the control and optimization system 200 according to an alternative exemplary embodiment may be utilized in a two-loop CL-based plant, to control, e.g., crossover flow from the SPCV 135 to the reducer 10, as shown in FIGS. 4 and 5. In an exemplary embodiment utilized in a single-loop CL-based plant, however, the crossover flow to the reducer 10 (as shown in FIG. 4) is not required.

The single loop 300 receives air 30 from an air source 340, and a solids source 350 supplies makeup solids (not shown) to the single loop 300 as required. In operation, solids (e.g., CaS 128 and $CaSO_4$ 127) (not shown) which flow (e.g., "loop") in the single loop 300 are oxidized in the oxidizer 20, are separated from $N_2$ 80 (FIG. 2) by the cyclone 130, and are the supplied to the SPCV 135. A flow rate of SPCV air 360 from the air source 340 effectively controls a flow rate of the solids in and through the SPCV based upon a desired value of the differential pressure difference 280. More specifically, the control and optimization signal optimally controls the flow rate of the SPCV air 360 by adjusting a position of a throttle valve 370 according to the input parameter 270, as shown in FIG. 4.

As a result, the control and optimization system 200 according to an exemplary embodiment effectively controls the flow rate of the solids of the single loop 300 during operation of the CL-based power plant 205 (FIG. 3). Further, as described in greater detail above with reference to FIG. 3, the control and optimization system 200 optimally controls the flow rate of the solids during all operations, e.g., steady state and transient, of the CL-based power plant 205. Thus, by utilizing the control and optimization system 200 to optimally control multiple variables of the CL process, such as a flow rate of the air 30 and/or the makeup solids, for example, an overall operational efficiency of the CL-based power plant 205 is substantially improved.

In summary, a control and optimization tool for a CL process of a CL-based power plant according to an exemplary embodiment provides stabilization of solid transport loops in the CL process, substantially improved delivery of demanded solids to reactors (e.g., reducers and oxidizers) to meet balance of plant production requirements, thereby: effectively minimizing power consumption for solids transport; maximizing the CL-process and overall power plant productivity; maximizing system operability during load changes, start-up and shut-down, for example; and effectively improving power plant reliability and/or availability. As a result, plant emissions are substantially reduced and/or effectively minimized while overall economic plant efficiency is substantially improved, resulting in lower overall operating costs.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for optimizing a chemical looping plant, the system comprising:
   a first chemical loop having a first input for receiving a first input parameter and a first output for outputting a first output parameter; the first chemical loop comprising an oxidizer and a reducer; the oxidizer being effective to oxidize reduced solids and transport the oxidized solids to the reducer; the reducer being effective to reduce the oxidized solids and transport the reduced solids to the oxidizer; and
   a control system operably connected to the first chemical loop and comprising a plurality of selectable controllers, wherein the control system receives the first output parameter, optimizes the first input parameter based on the received first output parameter, and outputs an optimized first input parameter to the first input of the first chemical loop to control a process of the first chemical loop in an optimized manner, wherein the control system comprises:
   a multiple controller input adapter, which selects one of a model-free controller, a proportional-integral-derivative controller, a fuzzy controller and a neural network adaptive controller based on the output parameter of the chemical loop.

2. The system of claim 1, wherein the chemical loop comprises one of a calcium-based chemical loop and a metal oxide-based chemical loop.

3. The system of claim 2, wherein the power plant comprises one of a single loop chemical looping plant, a multiple loop chemical looping plant, a chemical looping-based plant with $CO_2$ capture for utilization or sequestration and a chemical looping-based $CO_2$-ready plant.

4. The system of claim 1, wherein
   the input parameter comprises at least one of fuel flow, sorbent flow, air flow, water flow, limestone flow, solids circulation flow, plant start-up control logic algorithm, plant shut-down control logic algorithm, and a ratio of at least two of the fuel flow, the air flow, the limestone flow and the steam flow, and
   the output parameter comprises at least one of a power generation rate, $CO_2$ flow, $CO_2$ utilization, $CO_2$ capture, $CO_2$ storage, $CO_2$ sequestration, load demand, solids transport inventory, reactor temperature, loop temperature, bed temperature, pressure, differential pressure, reactor pressure, reactor differential pressure, $H_2$ flow, $N_2$ flow and synthesis gas flow.

5. The system of claim 1, wherein the control system further comprises:
   a multiple controller part comprising a model-free controller;
   a control set algorithm operably connected to the multiple controller part;
   an optimizer operably connected to the control set algorithm; and
   a security watchdog module operably connected to the control set algorithm.

6. The system of claim 5, further comprising an optimizer operably connected to the chemical loop.

7. The system of claim 5, wherein
   the control system further comprises a multiple controller input adapter disposed between the output of the chemical loop and the multiple controller part,
   the multiple controller part further comprises a model-based controller,
   the model-free controller comprises at least one of a proportional-integral-derivative controller, a fuzzy controller and a neural network adaptive controller, and
   the multiple controller input adapter selects one of the model-free controller, the proportional-integral-derivative controller, the fuzzy controller and the neural network adaptive controller based on the output parameter of the chemical loop.

8. A system for optimizing a power plant, the system comprising:
   a first chemical loop; the first chemical loop comprising an oxidizer and a reducer; the oxidizer being effective to oxidize reduced solids and transport the oxidized solids to the reducer; the reducer being effective to reduce the oxidized solids and transport the reduced solids to the oxidizer; the first chemical loop having a first input for receiving a first input parameter and a first output for outputting a first output parameter, the first chemical loop comprising:
      a first reactor having at least a first inlet and a first outlet;
      a first separator operably connected to the first outlet of the first reactor; and
      a first seal pot control valve disposed between the first separator and the first inlet of the first reactor; and
   a control system operably connected to the first chemical loop and comprising a plurality of selectable controllers,
   wherein the control system receives the first output parameter, optimizes the first input parameter based on the received first output parameter, and outputs an optimized first input parameter to the first input of the first chemical loop to control a process of the first chemical loop in an optimized manner.

9. The system of claim 8, wherein the first chemical loop comprises one of a calcium-based chemical loop and a metal oxide-based chemical loop.

10. The system of claim 8, wherein the power plant comprises one of a single loop chemical looping plant, a multiple loop chemical looping plant, a chemical looping-based plant with $CO_2$ capture for utilization or sequestration and a chemical looping-based $CO_2$-ready plant.

11. The system of claim 8, wherein
    the first input parameter comprises at least one of fuel flow, sorbent flow, air flow, water flow, limestone flow, solids circulation flow, a plant start-up control logic algorithm, a plant shut-down control logic algorithm, and a ratio of at least two of fuel flow, air flow, limestone flow and steam flow, and
    the first output parameter comprises at least one of power generation rate, $CO_2$ flow, $CO_2$ utilization, $CO_2$ capture, $CO_2$ storage, $CO_2$ sequestration, load demand, solids transport inventory, reactor temperature, loop temperature, bed temperature, pressure, differential pressure, reactor pressure, reactor differential pressure, $H_2$ flow, $N_2$ flow and syngas flow.

12. The system of claim 8, wherein the control system further comprises:
    a multiple controller part comprising a model-free controller;
    a control set algorithm operably connected to the multiple controller part;
    an optimizer operably connected to the control set algorithm; and
    a security watchdog module operably connected to the control set algorithm.

13. The system of claim 12, further comprising an optimizer operably connected to the first chemical loop.

14. The system of claim 8, wherein
    the control system further comprises a multiple controller input adapter disposed between the first output of the first chemical loop and the multiple controller part,
    the multiple controller part further comprises a model-based controller,
    the model-free controller comprises at least one of a proportional-integral-derivative controller, a fuzzy controller and a neural network adaptive controller, and
    the multiple controller input adapter selects one of the model-free controller, the proportional-integral-derivative controller, the fuzzy controller and the neural network adaptive controller based on the first output parameter of the first chemical loop.

15. The system of claim 8, further comprising:
    a second chemical loop having a second input for receiving a second input and a second output for outputting a second output parameter, the second chemical loop comprising:
       a second reactor having at least a second inlet and a second outlet;
       a second separator operably connected to the second outlet of the second reactor; and
       a second seal pot control valve disposed between the second separator and the second inlet of the second reactor and in fluid communication with the first seal pot control valve of the first chemical loop,
    wherein the control system further receives the second output parameter, optimizes the second input parameter based on the received second output parameter, and outputs an optimized second input parameter to the second input of the second chemical loop to control a process of the second chemical loop in an optimized manner.

16. The system of claim 8, wherein
    the first input parameter received by the first chemical loop comprises an air flow rate, and
    the first output parameter outputted by the first chemical loop comprises a differential pressure.

17. The system of claim 16, wherein
    the air flow rate comprises a seal pot control valve air flow rate, and
    the differential pressure comprises a pressure difference between a differential pressure of the first reactor and a differential pressure between an outlet of the first separator and the first inlet of the first reactor.

18. A system for optimizing a power plant, the system comprising:
a chemical loop; the chemical loop comprising an oxidizer and a reducer; the oxidizer being effective to oxidize reduced solids and transport the oxidized solids to the reducer; the reducer being effective to reduce the oxidized solids and transport the reduced solids to the oxidizer; the chemical loop having an input for receiving an input parameter and an output for outputting an output parameter, the chemical loop comprising:
a reactor having at least an inlet and an outlet;
a separator operably connected to the reactor outlet; and
a seal pot control valve disposed between the separator and the reactor inlet;
a control system comprising:
a multiple controller part comprising at least one of a model-based controller, a proportional-integral-derivative controller, a fuzzy controller, and a neural network adaptive controller;
a control set algorithm operably connected to the multiple controller part;
an optimizer operably connected to the control set algorithm;
a security watchdog model connected to the control set algorithm; and
a chemical looping process simulator operably connected to the chemical loop, wherein the control system
receives the output parameter from the output of the chemical loop,
optimizes the input parameter based on the received output parameter, and
outputs an optimized input parameter to the input of the chemical loop to control a process of the chemical loop in an optimized manner.

19. The system of claim 18, wherein
the power plant comprises one of a calcium-based single loop chemical looping plant, a calcium-based multiple loop chemical looping plant, a calcium-based chemical-looping based plant with $CO_2$ capture for utilization or sequestration, a calcium-based chemical-looping based $CO_2$-ready plant, a metal oxide-based single loop chemical looping plant, a metal oxide-based multiple loop chemical looping plant, a metal oxide-based chemical-looping based plant with $CO_2$ capture for utilization or sequestration and a metal oxide-based chemical-looping based $CO_2$-ready plant,
the input parameter comprises at least one of fuel flow, sorbent flow, air flow, water flow, limestone flow, solids circulation flow, plant start-up control logic algorithm, plant shut-down control logic algorithm, and a ratio of at least two of the fuel flow, the air flow, the limestone flow and the steam flow, and
the output parameter comprises at least one of power generation rate, $CO_2$ flow, $CO_2$ utilization, $CO_2$ capture, $CO_2$ storage, $CO_2$ sequestration, load demand, solids transport inventory, reactor temperature, loop temperature, bed temperature, pressure, differential pressure, reactor pressure, reactor differential pressure, $H_2$ flow, $N_2$ flow, and synthesis gas flow.

20. The system of claim 1, where the oxidized solid is a metal oxide.

21. The system of claim 1, where the oxidized solid is calcium oxide.

* * * * *